(12) United States Patent
Shindo et al.

(10) Patent No.: US 8,152,864 B2
(45) Date of Patent: Apr. 10, 2012

(54) METHOD FOR PRODUCTION OF HIGH PURITY COPPER SULFATE

(75) Inventors: Yuichiro Shindo, Ibaraki (JP); Kouichi Takemoto, Ibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 12/908,972

(22) Filed: Oct. 21, 2010

(65) Prior Publication Data

US 2011/0033369 A1    Feb. 10, 2011

Related U.S. Application Data

(62) Division of application No. 10/522,273, filed as application No. PCT/JP03/10251 on Aug. 12, 2003, now Pat. No. 7,887,603.

(30) Foreign Application Priority Data

Sep. 5, 2002  (JP) ................................. 2002-259755

(51) Int. Cl.
*B01D 9/00* (2006.01)
(52) U.S. Cl. ..................................... 23/295 R; 423/557
(58) Field of Classification Search ................ 23/295 R; 423/557
See application file for complete search history.

(56) References Cited

U.S. PATENT DOCUMENTS

| | | |
|---|---|---|
| 2,871,116 A | 1/1959 | Clark |
| 4,030,990 A | 6/1977 | Piret et al. |
| 4,288,304 A | 9/1981 | DeMarthe et al. |
| 4,394,316 A | 7/1983 | Chao |
| 4,908,242 A | 3/1990 | Hughes et al. |
| 5,059,403 A | 10/1991 | Chen |
| 5,240,497 A | 8/1993 | Shacham et al. |
| 6,562,222 B1 | 5/2003 | Sekiguchi et al. |
| 6,861,030 B2 | 3/2005 | Shindo |
| 6,896,788 B2 | 5/2005 | Shindo et al. |
| 7,138,040 B2 | 11/2006 | Okabe et al. |
| 7,374,651 B2 | 5/2008 | Aiba et al. |
| 7,435,325 B2 | 10/2008 | Shindo et al. |
| 7,648,621 B2 | 1/2010 | Aiba et al. |
| 7,695,527 B2 | 4/2010 | Shindo et al. |
| 7,799,188 B2 | 9/2010 | Aiba et al. |
| 7,887,603 B2 * | 2/2011 | Shindo et al. ............... 23/295 R |
| 2005/0232849 A1 | 10/2005 | Shindo et al. |
| 2008/0210568 A1 | 9/2008 | Aiba et al. |
| 2009/0004498 A1 | 1/2009 | Shindo et al. |

FOREIGN PATENT DOCUMENTS

| | | |
|---|---|---|
| JP | 47-040634 A | 10/1972 |
| JP | 57-155399 A | 9/1982 |
| JP | 61-083625 A | 4/1986 |
| JP | 05-262523 A | 10/1993 |
| JP | 2001-031419 A | 2/2001 |

OTHER PUBLICATIONS

One Page English Abstract of JP 07-053213 A, Feb. 28, 1995.
One Page English Abstract of JP 09-202619 A, Aug. 5, 1997.
One Page English Abstract of JP 2001-010817 A, Jan. 16, 2001.

* cited by examiner

*Primary Examiner* — Edward Johnson
(74) *Attorney, Agent, or Firm* — Howson & Howson LLP

(57) ABSTRACT

High purity copper sulfate having a purity of 99.99% or higher and in which the content of transition metals such as Fe, Cr, Ni is 3 wtppm or less is provided. A method for producing such high purity copper sulfate includes the steps of dissolving copper sulfate crystals in purified water, performing evaporative concentration thereto, removing the crystals precipitated initially, performing further evaporative concentration to effect crystallization, and subjecting this to filtration to obtain high purity copper sulfate. This manufacturing method of high purity copper sulfate allows the efficient removal of impurities from commercially available copper sulfate crystals at a low cost through dissolution with purified water and thermal concentration.

8 Claims, 1 Drawing Sheet

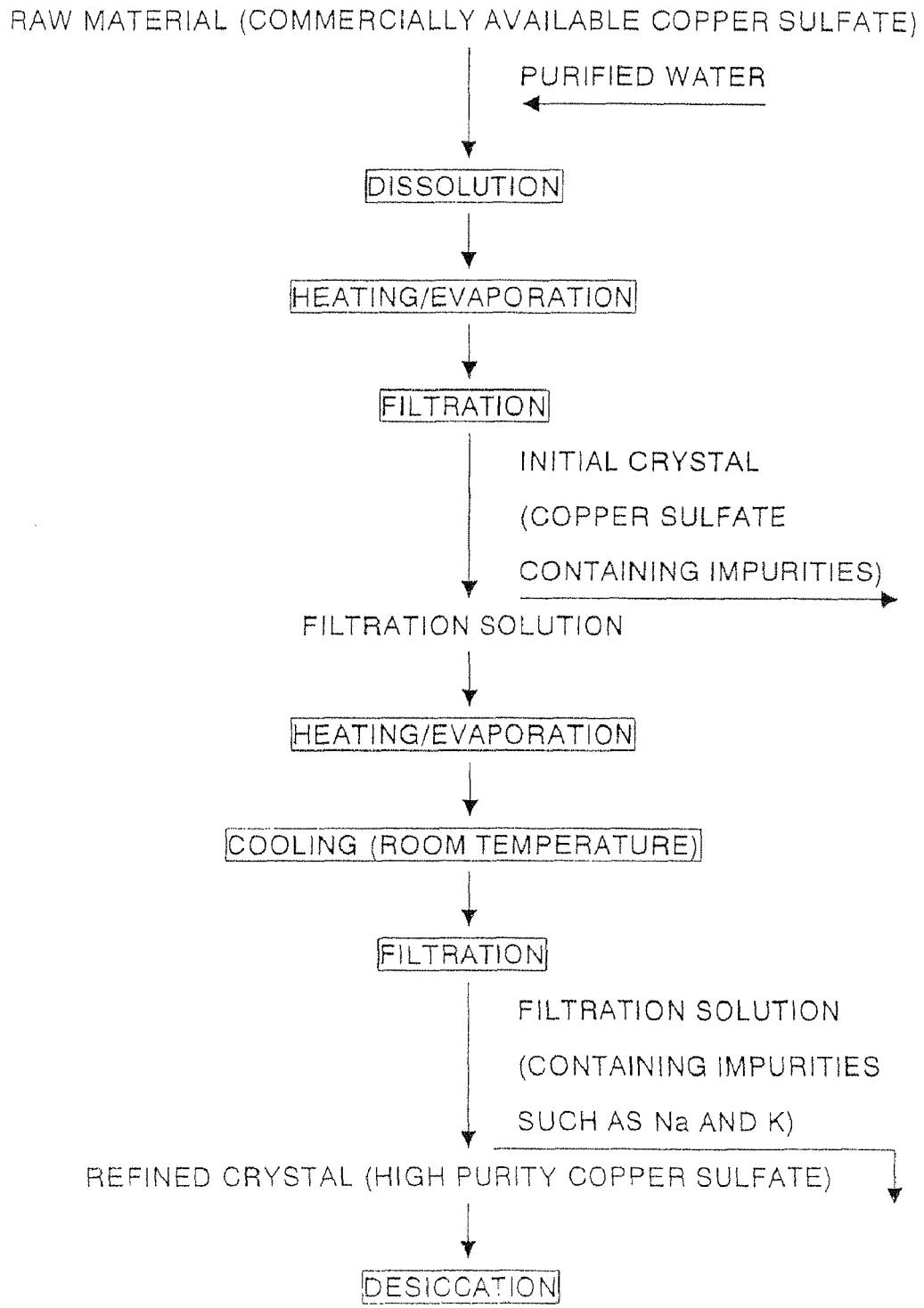

METHOD FOR PRODUCTION OF HIGH PURITY COPPER SULFATE

CROSS REFERENCE TO RELATED APPLICATIONS

This application is a divisional of co-pending U.S. application Ser. No. 10/522,273 which is the National Stage of International Application No. PCT/JP03/10251, filed Aug. 12, 2003, which claims the benefit under 35 USC §119 of Japanese Application No. 2002-259755, filed Sep. 5, 2002.

BACKGROUND OF THE INVENTION

The present invention relates to a manufacturing method of high purity copper sulfate which includes the steps of dissolving commercially available copper sulfate crystals (purity, for instance, is 95 to 99.9 wt %) in purified water, performing thermal concentration thereto, and filtering out the crystals precipitated initially to eliminate the impurities, and to the high purity copper sulfate obtained thereby. The starting material does not have to be copper sulfate crystal, and may be a material in which copper is dissolved with acid containing sulfuric acid, or copper sulfate crystals manufactured therefrom.

Although copper sulfate ($Cu_2SO_4$) is white-colored powder, Hydrous copper sulfate ($Cu_2SO_4$-$5H_2O$) is the general term thereof, and this is an azurite blue crystal.

Copper sulfate is used as an electrolytic solution, pigment, insecticide, antiseptic, mordant, battery material, pharmaceutical and so on. In particular, when it is to be used as the electroplating solution in electronic components such as a semiconductor device, high purity copper sulfate is being sought.

Commercially available copper sulfate has a purity level of 95 to 99.9 wt %, and it is necessary to purify this even further to obtain a level of 4N to 5N or more.

As conventional technology, described is a method to obtain copper sulfate with low Ni content by using electrolytic copper powder recovered from an electrolytic solution via electrodeposition as the raw material, immersing this into an acid solution to selectively dissolve and remove Ni, dissolving the filtered copper powder in sulfuric acid, and subjecting this to crystallization (for example, c.f. Japanese Patent Laid-Open Publication No. 2001-10817).

Further, disclosed is technology for obtaining copper sulfate with low nickel content by employing an aqueous solution of copper sulfate containing nickel and heating this to 80° C. or higher, collecting the copper sulfate crystal separated and sedimented, and concentrating this to effect recrystallization (for example, c.f. Japanese Patent Laid-Open Publication No. 2001-31419).

SUMMARY OF THE INVENTION

An object of the present invention is to provide a manufacturing method of high purity copper sulfate which allows the efficient removal of impurities from commercially available copper sulfate crystals at a low cost through dissolution with purified water and thermal concentration, and the high purity copper sulfate obtained thereby.

The present invention provides a manufacturing method of high purity copper sulfate, including the steps of dissolving copper sulfate crystals in purified water, performing evaporative concentration thereto, removing the crystals precipitated initially, performing further evaporative concentration to effect crystallization, subjecting this to filtration to obtain high purity copper sulfate, and performing desiccation thereto. The initial pH of the solution in which the copper sulfate was dissolved in purified water can be 2 to 4, and the pH of the solution after removing the crystals precipitated initially can be 2 or less. About 10 wt % or more of the initial crystal can be removed in relation to the initial input, and the filtration solution after the final filtration can be 2 to 40% of the original fluid volume. The desiccation temperature can be 40 to 100° C.

The present invention provides high purity copper sulfate having a purity of 99.99 wt % or higher, and in which the content of transition metals such as Fe, Cr, Ni is 3 wtppm or less. The content of Ag, Cl can be respectively 1 wtppm or less; the content of alkali metals such as Na, K and alkaline earth metals such as Ca, Mg can be respectively 1 wtppm or less; and the content of Si containing oxide can be 10 wtppm or less based on Si conversion.

BRIEF DESCRIPTION OF THE DRAWINGS

FIG. 1 is a diagram showing the flow of the manufacturing method of high purity copper sulfate.

DETAILED DESCRIPTION OF THE INVENTION

The analytical values of representative impurities of commercially available copper sulfate are shown in Table 1. Incidentally, by way of reference, the comprehensive analytical values including other impurities are shown in subsequent Table 6.

As shown in Table 1, this copper sulfate contains transition metals such as iron, nickel, cobalt; and impurities such as Ca, Cr, Al, respectively, in a content of roughly 0.5 to 100 wtppm. Further, in addition to the above, several wtppm to several ten wtppm of alkali elements such as Na, K; several ten wtppb of impurities of radioactive elements such as U, Th; and foreign matters such as oxides are also contained therein.

This copper sulfate is dissolved with purified water at room temperature. When impurities such as organic matter or foreign matter are mixed therein, impurities such as organic matter or foreign matter are subject to filtration and removed by performing active carbon treatment. Thereupon, noble metals such as Ag can also be removed.

When impurities such as organic matter or foreign matter are not mixed therein, this active carbon treatment does not have to be performed. When undissolved foreign matter exists, this may be removed with a filter cloth or the like, but may also be removed upon removing the initial crystals in the subsequent process. The initial pH of the solution in which the copper sulfate was dissolved in purified water is made to be 2 to 4. The reason the pH of this solution is made to be 2 to 4 is to promote the precipitation of initial crystals by ultrafine hydroxides of the copper sulfate being precipitated.

Next, the solution which dissolved copper sulfate or the filtration solution which filtrated copper sulfate solution is heated to a temperature of roughly 50 to 100° C., and subject to evaporative concentration.

TABLE 1

| | Fe | Ni | Co | Ca | Cr | Al | Na | K | U | Th wtppm |
|---|---|---|---|---|---|---|---|---|---|---|
| Raw Material | 81 | 4.3 | 3.5 | 3.5 | 18.1 | 3.2 | 13 | 3.1 | 0.01 | 0.02 |

After evaporative concentration, this is cooled to room temperature, and crystals are precipitated. These initial crystals contain numerous impurities, and, although the precipitated crystals are originally of a blue color, since the pH is high at 2 to 4, such crystals present a green color since they contain hydroxide. Further, numerous impurities can be removed as a result thereof. Thereupon, residue of the undissolved impurities can be simultaneously removed.

Moreover, by increasing the level of the foregoing evaporative concentration, the solution volume will decrease, the amount of initial crystals will increase, and the amount of removed impurities will increase. Nevertheless, when exceeding a certain level, the amount of removed impurities will not increase any further.

Thus, it is desirable to delete 10 wt % or more of the initial crystals (low-grade copper sulfate containing impurities) in relation to the initial input. Further, the lower the purity of the raw material to be used, it is desirable that the amount of initial crystal to be removed is increased.

After filtering and removing the crystals precipitated initially, the pH of the filtration solution is made to be 2 or less. This is to promote the precipitation of the copper sulfate without precipitating hydroxide. And, this is reheated to a temperature of 50 to 100° C., and subject to evaporative concentration.

Thereafter, this is cooled to room temperature, crystals of the copper sulfate are precipitated, and subject to filtration to obtain high purity copper sulfate of a blue color.

It is desirable that the filtration solution after the final filtration is 2 to 40 wt % of the original fluid volume. In other words, the filtration solution is to be the residual liquid containing non-crystallized copper sulfate, and the mixing of Na, K and so on which could not be removed from the initial crystal into the crystal can be prevented thereby. The desiccation temperature is preferably 40 to 100° C. If the temperature is less than 40° C., this is not preferable since much time will be required for removing the adsorption moisture, and, if the temperature exceeds 100° C., this is not preferable since the Hydrous copper sulfate adhesive moisture will be removed and the form of the copper sulfate will change.

As a result of the foregoing process, the various impurities shown in Table 1 are reduced to 1 wtppm or 0.1 wtppm or less, respectively, and high purity copper sulfate having a level of 4N to 5N or more can be obtained.

It is desirable that the content of Ag, Cl in the high purity copper sulfate is 1 wtppm or less, respectively. This is because when copper sulfate is to be used as the plating solution, Ag, Cl will have an adverse effect on the plating, and will be concentrated in the film.

It is desirable that the content of alkali metals such as Na, K and alkaline earth metals such as Ca, Mg in the high purity copper sulfate is 1 wtppm or less, respectively. This is because when copper sulfate is to be used as the plating solution in the manufacturing method of a semiconductor device, it is easily engulfed in the plating coating, and will have an adverse on the performance of the semiconductor.

Further, it is desirable that the amount of Si (containing oxide and based on Si conversion) in the high purity copper sulfate is 10 wtppm or less. This is because it will become foreign matter in the plating coating.

The flow of the manufacturing method of high purity copper sulfate according to the present invention is shown in the FIG. 1.

EXAMPLES

Examples of the present invention are now explained. Incidentally, these Examples are merely illustrative, and the present invention shall in no way be limited thereby. In other words, the present invention shall include, within the scope of its technical spirit, any and all modes or modifications other than the Examples of this invention.

250 g of commercially available copper sulfate ($Cu_2SO_4$-$5H_2O$) having a purity level of 99.9 wt % containing the impurities shown in Table 1 was dissolved in 1000 ml of purified water at room temperature.

Next, this was heated at 90° C. to evaporate water in a prescribed amount. Next, this was cooled to room temperature, the initial crystals were precipitated, and subject to filtration.

The relationship of the amount of filtration solution and the weight of initial crystals, as well as the relationship with the content of impurities (representatively showing the analytical value of Fe) contained in the ultimately refined material (copper sulfate) are shown in Table 2.

The weight of the initial crystals upon evaporating the filtration solution (liquid solution) such that the amount thereof decreases from 900 ml to 600 ml increased from 1 g to 80 g together with such evaporation. Further, the content of Fe impurities decreased from 15 ppm to 0.6 ppm.

Nevertheless, the impurities did not decrease when removing the initial crystals exceeding 10 wt %, and, since the yield of the copper sulfate will decrease, it is desirable to remove 10 wt % or more of the initial crystal in relation to the initial input.

TABLE 2

| Solution Volume (ml) | Weight of Initial Crystal (g) | Content of Impurities (Fe) (ppm) |
|---|---|---|
| 900 | 1 | 15 |
| 800 | 25 | 3 |
| 700 | 50 | 0.8 |
| 600 | 80 | 0.6 |

Next, the filtration solution of the copper sulfate which improved purity obtained by removing the initial 50 g of the crystal in Table 2 was reheated at 90° C., and water was evaporated in a prescribed amount. Then, this was cooled to room temperature, the refined copper sulfate crystal was precipitated, and subject to filtration.

When the evaporation is increased drastically, there is a possibility that impurities such as Na and K will be mixed in the refined copper sulfate, and, therefore, evaporation was discontinued midway to obtain residual liquid.

The amount of filtration solution (solution volume), weight of the refined copper sulfate ($Cu_2SO_4$-$5H_2O$) crystal, and the impurities (representatively shown with the Na content) contained in the refined copper sulfate crystal are shown in Table 3. As shown in Table 3, the solution volume after evaporation decreased from 300 to 10 ml, and the refined copper sulfate crystal increased from 150 to 230 g.

Further, the Na content in the refined copper sulfate crystal increased from 0.3 to 1.0 ppm, and, when the refined copper sulfate crystal was 230 g, it increased considerably to 5 wtppm. Thus, excessive evaporation is not preferable from the perspective of impurities such as Na, K. Therefore, it is desirable that the filtration solution after the final filtration is 2 to 40% of the original fluid volume.

TABLE 3

| Solution Volume (ml) | Weight of Refined Crystal (g) | Impurities Contained in the Refined Crystal (Na) (ppm) |
|---|---|---|
| 300 | 150 | 0.3 |
| 200 | 180 | 0.3 |
| 150 | 200 | 0.4 |
| 100 | 210 | 1.0 |
| 10 | 230 | 5 |

The analytical values of the representative impurities of the refined copper sulfate obtained in the refining process of the foregoing copper sulfate when 300 ml was evaporated in the process of removing the initial crystal, and this was concentrated to 300 ml in the process of precipitating the refined copper sulfate crystal, are shown in Table 4. Incidentally, by way of reference, the comprehensive analytical values containing other impurities of the refined copper sulfate are shown in subsequent Table 7.

As shown in Table 4, the primary impurities are Fe: 0.8 wtppm; Ni: 0.2 wtppm; Co<0.1 wtppm; Ca<0.1 wtppm; Cr: 0.1 wtppm; Al: 0.1 wtppm; Na: 0.4 wtppm; K<0.1 wtppm; U<0.005 wtppm; Th<0.005 wtppm and Si: 1.5 wtppm, and, as evident upon comparison with Table 1, significant improvement in the purity has been confirmed with the simple evaporation and filtration processes illustrated in the examples of the present invention.

These impurities are particularly disfavored in the copper electroplating to be performed to the likes of a circuit or wiring upon manufacturing a semiconductor device and so on, and the reduction of these impurities is extremely effective.

The initial make-up of the electroplating and electroless plating bath was conducted with this copper sulfate crystal, electrolytic copper plating and electroless copper plating were performed on a semiconductor wafer, and foreign matter (particles) and the embedding characteristics in the trench were measured. Incidentally, a trench for embedding a copper wiring was formed on the surface of the semiconductor wafer, and a barrier metal formed from TaN was attached to the surface thereof. And a thin copper layer was attached thereon with sputtering or CVD. Plating was performed thereto. The results are shown in Table 5.

Incidentally, the composition and plating conditions of the electroplating and electroless plating bath are as follows.

Electroplating Bath and Plating Conditions

As the plating solution, employed was copper sulfate: 20 g/L (Cu); sulfuric acid: 200 g/L; hydrochloric ion: 60 mg/L (Cl); and additive [brightening agent, surface active agent] (Product Name: CC-1220, manufactured by Nikko Metal Plating): 1 mL/L.

Plating conditions were plating bath temperature: 30° C.; cathode current density: 2.0 A/dm$^2$; anode current density: 2.0 A/dm$^2$; and plating time: 1 (min).

Electroless Plating Bath and Plating Conditions

As the electroless plating solution, employed was copper sulfate: 4 g/L (Cu); reducing agent: formaldehyde (37%) 3 mL/L; complexing agent: EDTA-2 Na 30 g/L; additive 1: Bipyridyl 20 mg/L; and additive 2: polyethylene glycol 20 mg/L.

And, plating was performed for 30 minutes at a plating temperature of 70° C. and pH of 12.2.

TABLE 4

4-1

|  | Fe | Ni | Co | Ca | Cr | Al (wtppm) |
|---|---|---|---|---|---|---|
| Refined Material | 0.8 | 0.2 | <0.1 | <0.1 | 0.1 | 0.1 |

4-2

|  | Na | K | U | Th | Si (wtppm) |
|---|---|---|---|---|---|
| Raw Material | 0.3 | <0.1 | <0.005 | <0.005 | 1.5 |

TABLE 5

|  | Plating Method | Amount of Foreign Matter (quantity) | Embedding Characteristics |
|---|---|---|---|
| Examples | Electroplating | 3 | Favorable |
|  | Electroless Plating | 1 | Favorable |
| Comparative Examples | Electroplating | 10 | Inferior |
|  | Electroless Plating | 8 | Inferior |

COMPARATIVE EXAMPLES

Commercially available copper sulfate having a level of 99.9 wt % containing the impurities shown in Table 1 was used to perform electroplating and electroless plating under the same conditions as the examples.

Foreign matter (particles) and the embedding characteristics in the trench in this case were measured as with Example 1, and the results are similarly shown in Table 5. As shown in Table 5, the amount of foreign matter in both electroplating and electroless plating in the comparative examples increased, and the embedding characteristics were inferior.

As shown in Table 5, in comparison to the comparative examples, the amount of foreign matter (particles) in the examples of the present invention was extremely small, there were no voids or engulfment of foreign matter, and a plating coating superior in embedding characteristics was obtained.

Accordingly, it is evident that the present invention yields a superior effect in that impurities can be effectively removed with low cost by a relatively simple method of dissolving commercially available copper sulfate having a purity level of 95 to 99.9 wt % in purified water and subjecting this to thermal concentration. And, it has been confirmed thereby that transition metal elements, alkali metal elements and radioactive elements that are often contained in the copper sulfate can be reduced, and the high purity copper sulfate can be obtained efficiently.

The present invention yields a superior effect in that high purity copper sulfate can be manufactured at a low cost as a result of effectively removing impurities by dissolving commercially available copper sulfate having a purity level of 95 to 99.9 wt % in purified water and subjecting this to thermal concentration.

TABLE 6

Raw Material of Copper Sulfate

| Element | Density (ppm wt) | Element | Density (ppm wt) |
|---|---|---|---|
| Li | <0.01 | Pd | <0.05 |
| Be | <0.01 | Ag | <0.05 |
| B | 1 | Cd | <0.1 |
| C | — | In | Binder |
| N | — | Sn | <1 |
| O | Matrix | Sb | <0.5 |
| F | <0.1 | Te | <0.1 |
| Na | 13 | I | <0.1 |
| Mg | 0.08 | Cs | <0.1 |
| Al | 3.2 | Ba | <0.05 |
| Si | 17 | La | <0.05 |
| P | 2.3 | Ce | <0.05 |
| S | Matrix | Pr | <0.05 |
| Cl | 8.5 | Nd | <0.05 |
| K | 3.1 | Sm | <0.05 |
| Ca | 3.5 | Eu | <0.05 |
| Sc | <0.01 | Gd | <0.05 |
| Ti | 0.04 | Tb | <0.05 |
| V | <0.01 | Dy | <0.05 |
| Cr | 18.1 | Ho | <0.05 |
| Mn | 0.02 | Er | <0.05 |
| Fe | 81 | Tm | <0.05 |
| Co | 3.5 | Yb | <0.05 |
| Ni | 4.3 | Lu | <0.05 |
| Cu | Matrix | Hf | <0.05 |
| Zn | <0.1 | Ta | <5 |
| Ga | <0.01 | W | <0.05 |
| Ge | <0.05 | Re | <0.01 |
| As | <0.05 | Os | <0.01 |
| Se | <0.1 | Ir | 1.8 |
| Br | <0.1 | Pt | <0.05 |
| Rb | <0.01 | Au | <0.1 |
| Sr | <0.01 | Hg | <0.05 |
| Y | <0.01 | Tl | <0.01 |
| Zr | <0.05 | Pb | ≦1.5 |
| Nb | <0.05 | Bi | <0.05 |
| Mo | <0.05 | Th | 0.02 |
| Ru | <0.05 | U | 0.01 |
| Rh | <100 | | |

TABLE 7

High Purity Copper Sulfate

| Element | Density (ppm wt) | Element | Density (ppm wt) |
|---|---|---|---|
| Li | <0.01 | Pd | <0.05 |
| Be | <0.01 | Ag | <0.05 |
| B | 0.04 | Cd | <0.1 |
| C | — | In | Binder |
| N | — | Sn | <1 |
| O | Matrix | Sb | <0.5 |
| F | <0.1 | Te | <0.1 |
| Na | 0.4 | I | <0.1 |
| Mg | <0.01 | Cs | <0.1 |
| Al | 0.1 | Ba | <0.05 |
| Si | 1.5 | La | <0.05 |
| P | 0.1 | Ce | <0.05 |
| S | Matrix | Pr | <0.05 |
| Cl | 0.8 | Nd | <0.05 |
| K | <0.1 | Sm | <0.05 |
| Ca | <0.1 | Eu | <0.05 |
| Sc | <0.01 | Gd | <0.05 |
| Ti | <0.01 | Tb | <0.05 |
| V | <0.01 | Dy | <0.05 |
| Cr | 0.1 | Ho | <0.05 |
| Mn | 0.03 | Er | <0.05 |
| Fe | 0.8 | Tm | <0.05 |
| Co | <0.01 | Yb | <0.05 |
| Ni | 0.2 | Lu | <0.05 |
| Cu | Matrix | Hf | <0.05 |
| Zn | 0.1 | Ta | <5 |
| Ga | <0.01 | W | <0.05 |
| Ge | <0.05 | Re | <0.01 |
| As | <0.05 | Os | <0.01 |
| Se | <0.1 | Ir | <0.05 |
| Br | <0.1 | Pt | <0.05 |
| Rb | <0.01 | Au | <0.1 |
| Sr | <0.01 | Hg | <0.05 |
| Y | <0.01 | Tl | <0.01 |
| Zr | <0.05 | Pb | ≦0.7 |
| Nb | <0.05 | Bi | <0.05 |
| Mo | <0.05 | Th | <0.005 |
| Ru | <0.05 | U | <0.005 |
| Rh | <100 | | |

We claim:

1. A method of manufacturing copper sulfate having a purity of 99.99 wt % or higher and a content of transition metals such as Fe, Cr, and Ni of 3 wtppm or less, comprising the steps of dissolving copper sulfate crystals in purified water, performing evaporative concentration thereto, removing crystals precipitated initially, performing further evaporative concentration to effect crystallization, subjecting this to filtration to obtain high purity copper sulfate, and performing desiccation thereto.

2. A method according to claim 1, wherein the initial pH of the solution in which the copper sulfate was dissolved in purified water is 2 to 4, and the pH of the solution after removing the crystals precipitated initially is 2 or less.

3. A method according to claim 2, wherein 10 wt % or more of the initial crystals is removed in relation to an initial input.

4. A method according to claim 3, wherein after the filtration, a remaining filtration solution is 2 to 40% of an original fluid volume.

5. A method according to claim 4, wherein desiccation temperature is 40 to 100° C.

6. A method according to claim 1, wherein 10 wt % or more of the initial crystals is removed in relation to an initial input.

7. A method according to claim 1, wherein after the filtration, a remaining filtration solution is 2 to 40% of an original fluid volume.

8. A method according to claim 1, wherein desiccation temperature is 40 to 100° C.

* * * * *